US010178212B2

(12) United States Patent
Dai et al.

(10) Patent No.: US 10,178,212 B2
(45) Date of Patent: Jan. 8, 2019

(54) MOBILE TERMINAL AND METHOD FOR DETERMINING ANTENNA

(71) Applicant: Beijing Xiaomi Mobile Software Co., Ltd., Haidian District, Beijing (CN)

(72) Inventors: Lin Dai, Beijing (CN); Hengbin Cui, Beijing (CN); Dawei Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/489,226

(22) Filed: Apr. 17, 2017

(65) Prior Publication Data

US 2017/0310805 A1    Oct. 26, 2017

(30) Foreign Application Priority Data

Apr. 25, 2016 (CN) .......................... 2016 1 0261203

(51) Int. Cl.
*H04M 1/00* (2006.01)
*H04B 1/38* (2015.01)
(Continued)

(52) U.S. Cl.
CPC ............ *H04M 1/725* (2013.01); *H01Q 1/242* (2013.01); *H04B 1/3833* (2013.01); *H04M 2250/12* (2013.01)

(58) Field of Classification Search
CPC ....... H04B 1/40; H04B 7/0608; H04M 1/026; H04M 2250/12; H04M 2250/22; H04W 4/02; H04W 88/02
(Continued)

(56) References Cited

U.S. PATENT DOCUMENTS 6,285,893 B1    9/2001 Keirinbou
8,406,806 B2 *  3/2013 Wong ..................... H01Q 1/243
                                                455/550.1
(Continued)

FOREIGN PATENT DOCUMENTS

CN    102684718 A    9/2012
CN    103187986 A    7/2013
(Continued)

OTHER PUBLICATIONS

International Search Report issued in corresponding PCT Application No. PCT/CN2016/095563, dated Jan. 18, 2017, 11 pages.
(Continued)

*Primary Examiner* — Quochien B Vuong
(74) *Attorney, Agent, or Firm* — Arch & Lake LLP

(57) ABSTRACT

A mobile terminal and an antenna determining method are provided. The mobile terminal includes a housing, a processor, at least two antennas and at least two pressure sensors. The pressure sensors are configured to acquire values of pressures applied to a surface of the housing and send the acquired pressure values to the processor; the processor is configured to receive pressure values sent by the pressure sensors, to determine at least one contact position between a user and the mobile terminal based on pressure values sent by at least one of one or more first side pressure sensors and at least one of one or more second side pressure sensors, to determine an antenna to receive or send signals from the at least two antennas based on the at least one contact position.

13 Claims, 8 Drawing Sheets

(51) Int. Cl.
*H04M 1/725* (2006.01)
*H01Q 1/24* (2006.01)
*H04B 1/3827* (2015.01)

(58) Field of Classification Search
USPC ............... 455/90.3, 272, 277.1, 575.1, 577.7
See application file for complete search history.

(56) References Cited

U.S. PATENT DOCUMENTS

| | | |
|---|---|---|
| 9,608,711 B2 * | 3/2017 | Bellamkonda ....... H04B 7/0632 |
| 2002/0094789 A1 | 7/2002 | Harano |

FOREIGN PATENT DOCUMENTS

| | | |
|---|---|---|
| CN | 103716468 A | 4/2014 |
| CN | 104638344 A | 5/2015 |
| CN | 104993855 A | 10/2015 |
| EP | 1453136 A1 | 9/2004 |

OTHER PUBLICATIONS

European Patent Office, Extended European Search Report, Application No. 17166506.0, dated Sep. 8, 2017.

* cited by examiner

```
┌─────────────────────────────────────────────────────────────┐
│ A MOBILE TERMINAL ACTUATES AT LEAST TWO PRESSURE SENSORS    │── 301
│ ARRANGED AT ITS TWO SIDES, AFTER RECEIVING A SERVICE REQUEST│
│ FOR RECEIVING OR SENDING A SIGNAL                           │
└─────────────────────────────────────────────────────────────┘
                              │
                              ▼
┌─────────────────────────────────────────────────────────────┐
│ THE MOBILE TERMINAL ACQUIRES VALUES OF PRESSURES APPLIED TO │── 302
│ THE HOUSING SURFACE OF THE MOBILE TERMINAL USING ONE OR MORE│
│ FIRST SIDE PRESSURE SENSORS AND ONE OR MORE SECOND SIDE     │
│ PRESSURE SENSORS, AND DETERMINES MULTIPLE CONTACT POSITIONS │
│ BETWEEN A USER AND THE MOBILE TERMINAL BASED ON THE ACQUIRED│
│ PRESSURE VALUES                                             │
└─────────────────────────────────────────────────────────────┘
                              │
                              ▼
┌─────────────────────────────────────────────────────────────┐
│ IF A FIRST CONTACT POSITION AMONG THE MULTIPLE CONTACT      │── 303
│ POSITIONS AND THE REST OF THE CONTACT POSITIONS ARE LOCATED │
│ ON SURFACES OF DIFFERENT SIDE FRAMES, THE FURTHEST ANTENNA  │
│ FROM THE FIRST CONTACT POSITION AMONG THE AT LEAST TWO      │
│ ANTENNAS IS DETERMINED AS THE ANTENNA TO RECEIVE OR SEND    │
│ SIGNALS, SO AS TO RECEIVE OR SEND SIGNALS USING THE         │
│ DETERMINED ANTENNA                                          │
└─────────────────────────────────────────────────────────────┘
```

Fig. 3

MOBILE TERMINAL AND METHOD FOR DETERMINING ANTENNA

CROSS-REFERENCE TO RELATED APPLICATION

This application is based on and claims the priority of the Chinese patent application No. 201610261203.5, filed on Apr. 25, 2016, which is incorporated herein by reference in its entirety.

TECHNICAL FIELD

The present disclosure is related to the field of terminal technology, and more particularly, to a mobile terminal and methods for determining antenna.

BACKGROUND

An antenna is an element of a mobile terminal for receiving and sending signals. Through the antenna, the mobile terminal can receive signals sent by other devices or send signals to other devices. To prevent the function of receiving and sending signals from being affected by a failure of an antenna, the mobile terminal is usually configured with multiple antennas. When it needs to receive or send signals, one of the antennas can be selected randomly for receiving or sending the signals.

When using the mobile terminal, a user may hold it with a hand. At that time, if the user's hand covers one of the mobile terminal's antennas which is being used, signals received or sent by the antenna will be interfered with and the mobile terminal's function of receiving and sending signals will be affected.

SUMMARY

According to a first aspect of the present disclosure, there is provided a mobile terminal. The mobile terminal includes: a housing, a processor, at least two antennas and at least two pressure sensors arranged at two sides of the mobile terminal. The at least two antennas and the at least two pressure sensors are connected with the processor respectively. One or more first side pressure sensors among the at least two pressure sensors are arranged on a surface of a first side frame of the housing, and one or more second side pressure sensors among the at least two pressure sensors are arranged on a surface of a second side frame of the housing. The second side frame opposing the first side frame. The at least two pressure sensors are configured to acquire values of pressures applied to a surface of the housing and send the acquired pressure values to the processor. The processor is configured to receive pressure values sent by the pressure sensors, to determine at least one contact position between a user and the mobile terminal based on pressure values.

According to a second aspect of the present disclosure, there is provided a method for determining an antenna. The method includes: acquiring values of pressures applied to a housing surface of a mobile terminal by at least two pressure sensors arranged at two sides of the mobile terminal, where one or more first side pressure sensors among the at least two pressure sensors are arranged on a surface of a first side frame of the mobile terminal, and one or more second side pressure sensors among the at least two pressure sensors are arranged on a surface of a second side frame of the mobile terminal, the second side frame opposing the first side frame; determining at least one contact position between a user and the mobile terminal, based on pressure values acquired by at least one of the first side pressure sensors and at least one of the second side pressure sensors; and selecting an antenna as a preferred antenna to receive or send signals from the at least two antennas based on the at least one contact position.

According to a third aspect of the present disclosure, there is provided a mobile terminal. The mobile terminal includes: a pressure acquiring module configured to acquire values of pressures applied to a housing surface of the mobile terminal by at least two pressure sensors arranged at two sides of the mobile terminal, where one or more first side pressure sensors among the at least two pressure sensors are arranged on a surface of a first side frame of the mobile terminal, and one or more second side pressure sensors among the at least two pressure sensors are arranged on a surface of a second side frame of the mobile terminal, the second side frame opposing the first side frame; a position determining module configured to determine at least one contact position between a user and the mobile terminal, based on pressure values acquired by at least one of the first side pressure sensors and at least one of the second side pressure sensors; and an antenna determining module configured to determine an antenna to receive or send signals from the at least two antennas based on the at least one contact position.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a flow chart showing an antenna determining method according to another exemplary embodiment.

DETAILED DESCRIPTION

In order to make the objects, the technical solutions and the advantages of the present disclosure more clear, the present disclosure will be described in detail with reference to the accompany drawings. The illustrative embodiments of the disclosure and the description thereof are intended to explain this disclosure rather than to limit this disclosure.

The embodiments of this disclosure provide a mobile terminal and an antenna determining method, which will be described in detail with reference to the accompany drawings.

Figure 1A:
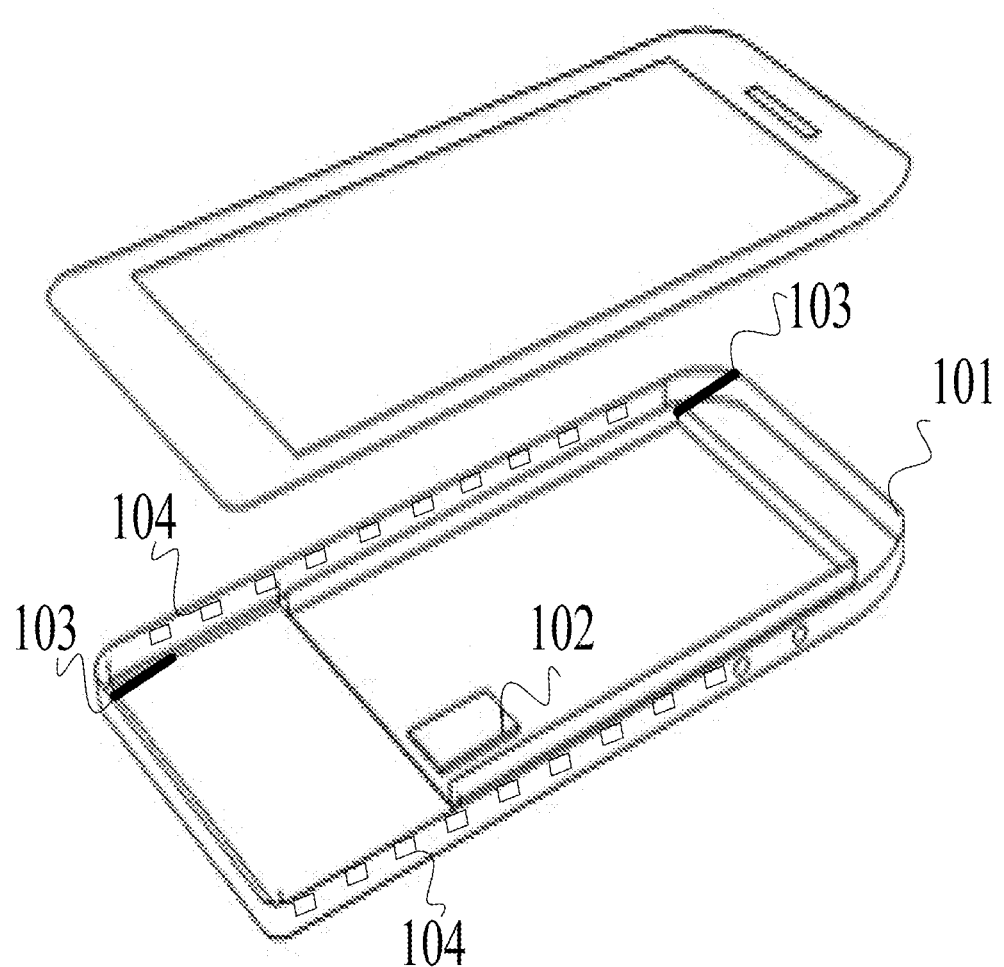
FIG. 1A is a schematic diagram of a mobile terminal according to an exemplary embodiment.

FIG. 1A is a schematic diagram of a mobile terminal according to an exemplary embodiment. The mobile terminal may be a handset, a tablet computer or the like, which will not be limited in this embodiment. As shown in FIG. 1A, the mobile terminal comprises a housing 101, a processor 102, at least two antennas 103 and at least two pressure sensors 104 arranged at two sides of the mobile terminal.

The at least two antennas 103 may be completely arranged inside the housing 101, or may be partly arranged inside the housing 101 with a part of the at least two antennas 103 protruding from the surface of the housing 101, which will not be limited in this embodiment.

Figure 1B:
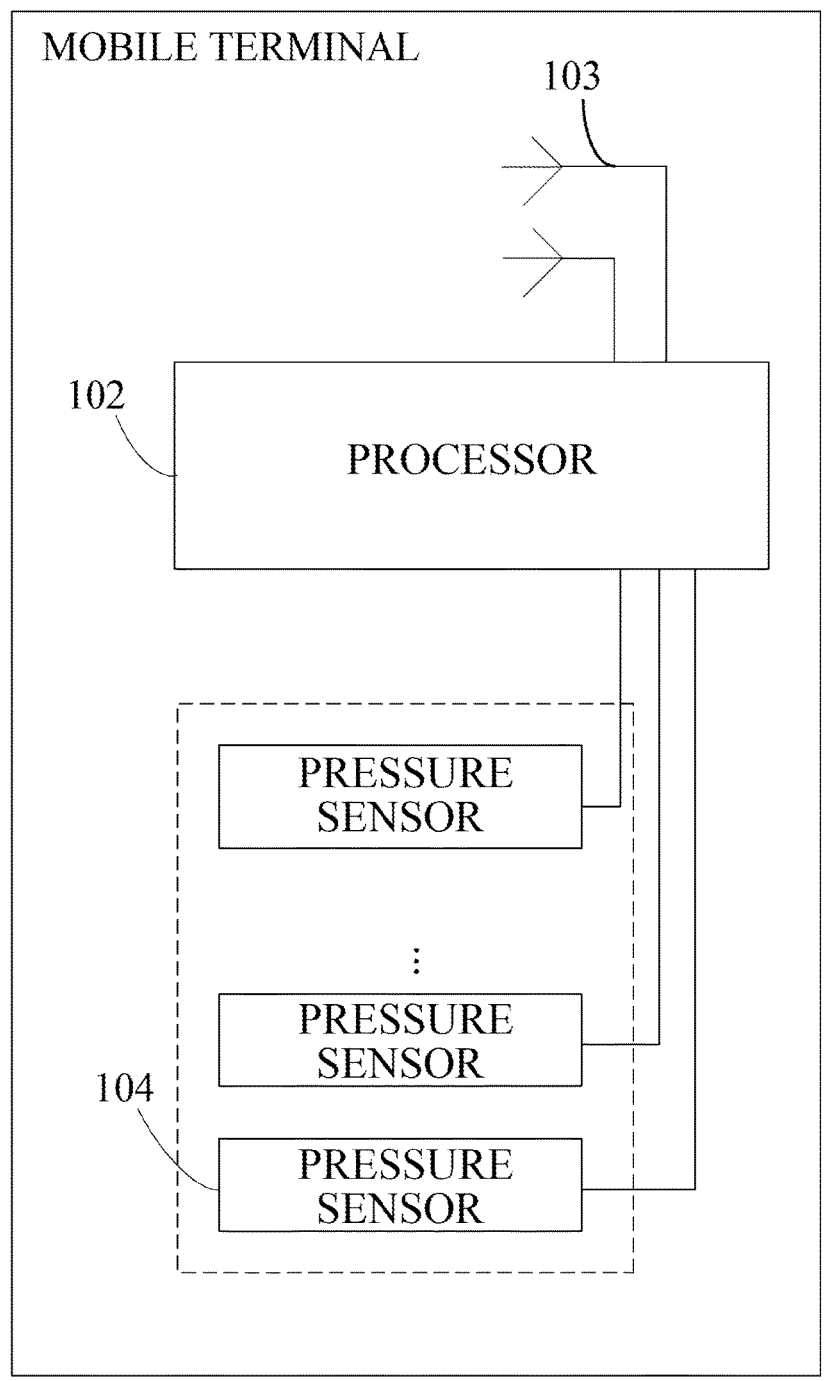
FIG. 1B is a schematic structural diagram of a mobile terminal according to an exemplary embodiment.

Referring to FIG. 1B, the at least two antennas 103 and the at least two pressure sensors 104 are connected with the processor 102 respectively. That is, outputs of the at least two pressure sensors 104 are connected with the processor 102 so as to send acquired pressure values thereto. The at least two antennas 103 are connected with the processor 102 so as to transfer received signals thereto or send signals under the control of the processor 102.

An existing mobile terminal is typically configured with multiple antennas. When it is required to receive or send signals, any one of the multiple antennas can be selected for receiving or sending signals. However, when a user holds the mobile terminal with a hand that covers an antenna of the mobile terminal, the signals received or transmitted by the antenna will be interfered with. Therefore, to avoid interference, the mobile terminal may first determine contact positions between the user and the mobile terminal, and then select an antenna to receive or send signals from the multiple antennas based on the determined contact positions, so as not to use the antenna covered by the user.

In practical application, when the user wants to use the mobile terminal, he/she usually first picks up the mobile terminal with his/her hand. Then, the user's fingers will contact the housing surface of the mobile terminal, and apply some pressures thereon. Therefore, values of pressures applied to the housing surface of the mobile terminal or changes of such values can reflect the contact condition between the user and the mobile terminal.

To conveniently determine the contact positions between the user and the mobile terminal, at least two pressure sensors 104 may be arranged in the mobile terminal, so that the contact positions between the user and the mobile terminal can be determined based on the pressure values acquired by the at least two pressure sensors 104.

The at least two pressure sensors 104 include sensing elements arranged on the surface of the housing 101 for sensing pressures applied to the mobile terminal. For example, the pressure sensor 104 may include a plurality of sensing elements, which include at least one of: induction elements, conversion circuit, and auxiliary power supply, etc. The sensing elements may be arranged at the sensing positions of the pressure sensors.

The at least two pressure sensors 104 may include strain gauge pressure sensors, piezoelectric pressure sensors or the like, which will not be limited in this embodiment. Different types of pressure sensors include different types of sensing elements. For example, sensing elements of strain gauge pressure sensors are resistance strain gauges, and sensing elements of piezoelectric pressure sensors are piezoelectric materials such as quartz. In addition, the types of the at least two pressure sensors 104 may be the same or different, which will not be limited in this embodiment.

Figure 1C:
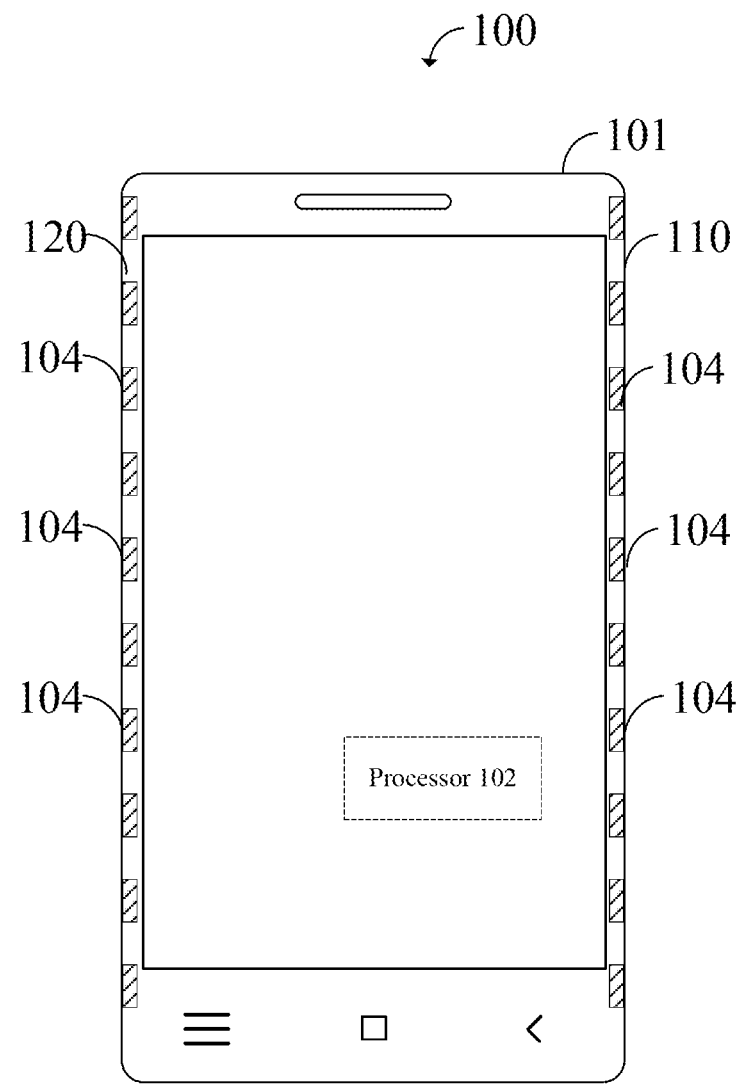
FIG. 1C is a schematic diagram showing a distribution of pressure sensors according to an exemplary embodiment.

Further, the sensing elements of the at least two pressure sensors 104 may be distributed on the mobile terminal evenly or unevenly, which will not be limited in this embodiment. The at least two pressure sensors 104 may be distributed in various manners. Referring to FIG. 1C, the mobile terminal 100 includes a housing 101 having two side frames 110 and 120 opposing each other. The at least two pressure sensors 104 may be distributed on the housing surface in a discrete manner, where any two adjacent sensors 104 may be separated from each other. In this case, each pressure sensor corresponds to one sensing position and can acquire a pressure value at the corresponding sensing position.

Figure 1D:
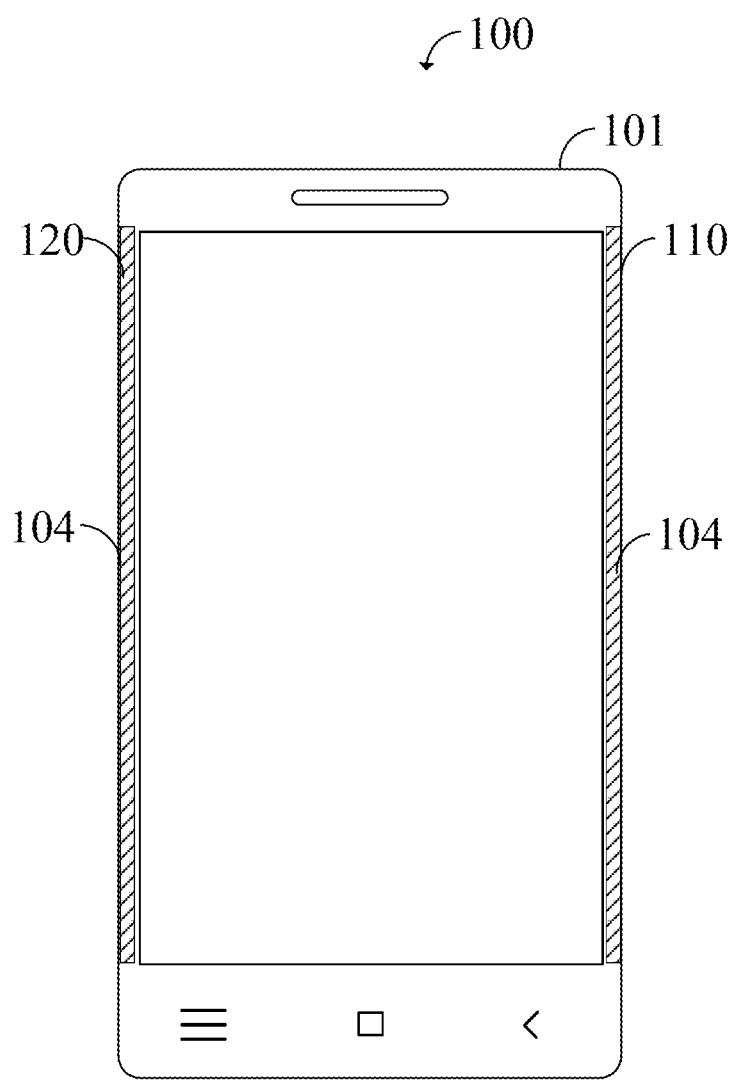
FIG. 1D is a schematic diagram showing another distribution of pressure sensors according to an exemplary embodiment.

Alternatively, referring to FIG. 1D, the sensing elements of the at least two pressure sensors may be distributed on the housing surface in a strip-shaped manner. That is, each pressure sensor corresponds to multiple sensing positions and can acquire pressure values at the corresponding sensing positions.

Further, the mobile terminal may include sensing elements disposed in both strip-shaped manor and discrete manner. For example, the mobile terminal may include the strip-shaped sensing elements near the lower end where the home button is disposed. The mobile terminal may include the sensing elements in discrete manner near the upper end where the front camera is disposed.

To facilitate sensing the pressures applied to the frame surface of the mobile terminal when the user holds the mobile terminal with a hand, the at least two pressure sensors 104 may be distributed at two side frames 110 and 120 of the mobile terminal 100. That is, the at least two pressure sensors 104 includes one or more first side pressure sensor 104 and one or more second side pressure sensor 104, wherein sensing elements of the first side pressure sensors 104 are arranged on a surface of a first side frame of the housing 101, and sensing elements of the second side pressure sensors 104 are arranged on a surface of a second side frame of the housing 101, and the second side frame opposes the first side frame. The sensing elements can sense the pressures applied to the frame surface of the mobile terminal. When the user holds the mobile terminal with a hand, the pressure sensors 104 can acquire values of pressures at the contact positions between the user and the frame surface of the mobile terminal through the sensing elements.

The first side frame and the second side frame may be left and right frames of the housing 101, or upper and lower frames thereof or the like, and the first side frame opposes the second side frame. For example, if the first side frame is the left frame, the second side frame will be the right frame; if the first side frame is the upper frame, the second side frame will be the lower frame, which will not be limited in this embodiment.

Figure 1E:
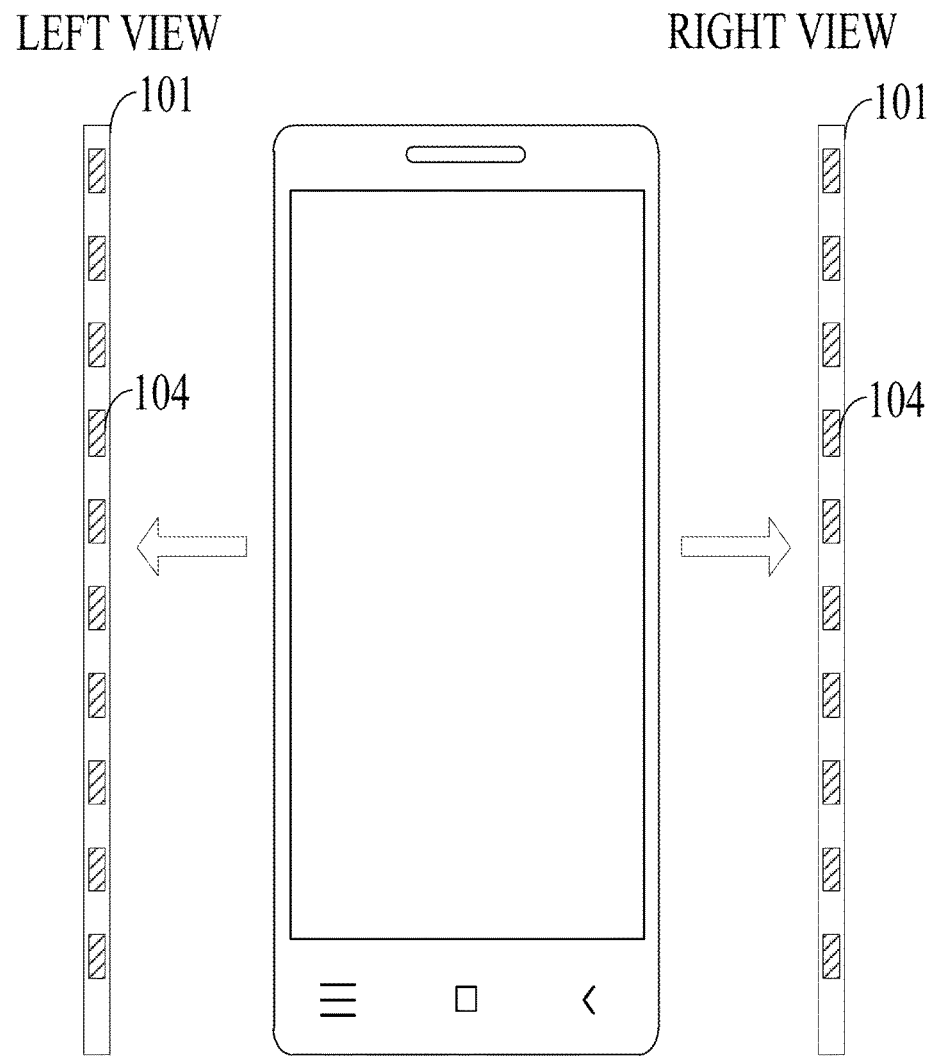
FIG. 1E are schematic left and right views according to an embodiment.

Take the pressure sensors distributed in a dotted manner as an example. Referring to the left and right views in FIG. 1E, the mobile terminal includes multiple pressure sensors 104, and the sensing elements of the multiple pressure sensors 104 are distributed at the surfaces of the left and right frames of the housing 101 respectively.

In this embodiment, determining the contact positions between the user and the mobile terminal based on the pressure values acquired by the at least two pressure sensors 104 may be performed in any of the following three manners.

Manner 1: When it is determined by the processor 102 that the pressure values sent by at least one of the first side pressure sensors and at least one of the second side pressure sensors at a current time point are different from those sent at a last time point, sensing positions of the at least one of the first side pressure sensors and the at least one of the second side pressure sensors are determined as the contact positions between the user and the mobile terminal.

When values of pressures on the housing surface of the mobile terminal change, it can be considered that the user is contacting the mobile terminal. When values of pressures on the first side surface and the second side surface of the housing change, it can be considered that the user is contacting both side surfaces of the housing, that is, the user is holding the mobile terminal. Therefore, after the processor 102 receives the pressure values sent by the multiple pressure sensors 104, when it is determined by the processor 102 that pressure values sent by at least one of the first side pressure sensors and at least one of the second side pressure sensors at a current time point are different from those sent at a last time point (which means that the pressure values at the sensing positions of the at least one of the first side pressure sensors 104 and the at least one of the second side sensors 104 change), then it can be determined that the user has contacted the sensing positions of the at least one of the first side pressure sensors 104 and the at least one of the second side pressure sensors 104, and the sensing positions of the at least one of the first side pressure sensors 104 and the at least one of the second side pressure sensors 104 are determined as the contact positions between the user and the mobile terminal.

Manner 2: When it is determined by the processor 102 that pressure values sent by at least one of the first side pressure sensors and at least one of the second side pressure sensors belong to a preset set of pressure values, sensing positions of the at least one of the first side pressure sensors and the at least one of the second side pressure sensors are determined as the contact positions between the user and the mobile terminal.

Since pressure values generated when a human presses the housing surface of the mobile terminal are usually maintained within a certain range, values of pressures applied to contact positions on the mobile terminal by the user when the user contacts the mobile terminal should belong to a range of pressure values generated when a human presses the housing surface of the mobile terminal normally. In view of this, the mobile terminal may previously determine a preset set of pressure values, which is set according to pressure values generated when a human presses the housing surface of the mobile terminal. When a pressure value sent by a pressure sensor belongs to the preset set of pressure values, it means that the user has contacted the sensing position of the pressure sensor.

Therefore, when the processor 102 determines that pressure values sent by at least one of the first side pressure sensors 104 and at least one of the second side pressure sensors 104 belong to the preset set of pressure values respectively (which means that the user has contacted the sensing positions of the at least one of the first side pressure sensors 104 and the at least one of the second side pressure sensors 104), then the sensing positions of the at least one of the first side pressure sensors 104 and the at least one of the second side pressure sensors 104 are determined as the contact positions between the user and the mobile terminal.

The preset set of pressure values may include a continuous range of pressure values, or one or more discrete pressure values, which will not be limited in this embodiment. In addition, when other objects for daily use contact the mobile terminal, small pressures will be generated with respect to the housing surface of the mobile terminal. For example, if the mobile terminal is put in a pocket, pressures will be generated by the pocket with respect to the housing surface of the mobile terminal. Therefore, to avoid undesirable contacts, the preset set of pressure values may include at least a minimum pressure value. Only when the pressure values sent by the at least one of the first side pressure sensors 104 and the at least one of the second side pressure sensors 104 are greater than the minimum pressure value, will it be guaranteed that the pressure values are large enough and do not result from contacts between other objects and the mobile terminal.

Manner 3: When the processor 102 determines that pressure values sent by at least one of the first side pressure sensors 104 and at least one of the second side pressure sensors 104 at a current time point are different from those sent at a last time point and belong to a preset set of pressure values, sensing positions of the at least one of the first side pressure sensors and the at least one of the second side pressure sensors are determined as the contact positions between the user and the mobile terminal, wherein the preset set of pressure values is set according to pressure values generated when a human presses the housing surface of the mobile terminal.

To improve the detection accuracy, Manners 1 and 2 may be combined. That is, the processor 102 considers the above both conditions. When the processor 102 determines that pressure values sent by at least one of the first side pressure sensors 104 and at least one of the second side pressure sensors 104 at a current time point are different from those sent at a last time point and belong to a preset set of pressure values, it is determined that the user has contacted the sensing positions of the at least one of the first side pressure sensors 104 and the at least one of the second side pressure sensors 104. When both conditions are met, the sensing positions of the at least one of the first side pressure sensors 104 and the at least one of the second side pressure sensors 104 are determined as the contact positions between the user and the mobile terminal. One or more additional conditions may be introduced to improve the accuracy of determination by using one or more additional sensors in the mobile terminal.

According to the mobile terminal provided by the present embodiment, by acquiring values of pressures applied to the mobile terminal using at least two pressure sensors arranged at two sides of the mobile terminal, an antenna to receive or send signals can be determined based on at least one contact position between the user and the mobile terminal when the user holds the mobile terminal with a hand, thereby avoiding interference to signals transmitted or received by an antenna due to the antenna being covered by the user's hand, and thus preventing the mobile terminal's function of receiving and sending signals from being affected.

In another embodiment, after the processor 102 determines the at least one contact position between the user and the mobile terminal, the furthest antenna from the at least one contact position among the at least two antennas may be selected as the antenna to receive or send signals, so as to avoid interference to signals received or sent by the antenna caused by the user.

For example, the processor 102 may statistically process the at least one contact position to obtain a central contact position of the at least one contact position, and determine the furthest antenna from the central contact position among the at least two antennas as the antenna to receive or send signals.

The processor 102 may establish a coordinate system, calculate average coordinates based on coordinates of the at least one contact position in the coordinate system and take the position corresponding to the calculated average coordinates as the central contact position. Alternatively, the processor may select one of the at least one contact position which is located at the center as the central contact position based on the coordinates of the at least one contact position in the coordinate system; that is, to select one of the contact positions whose distances from the other contact positions are relatively small as the central contact position.

In addition, when the user holds the mobile terminal with a hand, the user's palm will most likely cover an antenna; and among the five fingers, the contact position between the thumb and the mobile terminal can best reflect the position of the user's palm. In view of this, to prevent the antenna from being covered by the user's palm, the processor 102 can determine the antenna to receive or send signals from the at least two antennas based on the contact position between the thumb and the mobile terminal.

When the user holds the mobile terminal with a hand, the contact position between the thumb and the mobile terminal is usually located at a side different from that at which the contact positions between other fingers and the mobile terminal are located. Therefore, after the processor 102 determines the at least one contact position between the user and the mobile terminal, the processor 102 may determine surfaces of side frames where the contact positions are located respectively. When the processor 102 determines that a first contact position among the at least one contact position and the rest of the contact positions are located on surfaces of different side frames (which means that the first contact position is the contact position between the user's thumb and the mobile terminal), then the processor 102 determines the furthest antenna from the first contact position among the at least two antennas as the preferred antenna to receive or send signals.

After one of the antennas is selected as the preferred antenna, the mobile terminal may further assign a higher level of confidence to the signals received from the preferred antenna and assign a lower level of confidence to signals received from other antennas. The mobile terminal may also adjust transmission power to the antennas based on the determination result.

The case where the first contact position among the at least one contact position and the rest of the contact positions are located on surfaces of different side frames may include a case where the first contact position is located on the surface of a first side frame while the rest of the contact positions other than the first contact position are located on the surface of a second side frame or vice versa, which will not be limited in this embodiment.

For example, the mobile terminal is provided with two antennas at its upper and lower portions, respectively. When the user holds the mobile terminal with a hand and the thumb is located at the lower portion of the mobile terminal (which means that the user's palm is located at the lower portion of the mobile terminal and will probably cover the lower antenna), the upper antenna is selected for receiving or sending signals. When the user holds the mobile terminal with a hand and the thumb is located at the upper portion of the mobile terminal (which means the user's palm is located at the upper portion of the mobile terminal and will probably cover the upper antenna), the lower antenna is selected for receiving or sending signals.

Of course, the processor 102 may determine the antenna for receiving or sending signals based on the at least one contact position between the user and the mobile terminal using other methods which will not be limited in this embodiment, so long as the determined antenna is further from the at least one contact position compared with any other antenna.

In another embodiment, the processor 102 may actuate the at least two pressure sensors in real time. The at least two pressure sensors acquire values of pressure on the mobile terminal to determine an antenna to receive or send signals. Then, after receiving a service request for receiving or sending a signal, the processor 102 can receive or send the signal using the determined antenna. Alternatively, to prevent excessive power consumption and save resources, the processor 102 may actuate the at least two pressure sensors only when receiving a service request for receiving or sending a signal.

The service request for receiving or sending a signal refers to a service request for receiving a signal or sending a signal. The service request may be triggered by the processor 102, the user's operation of receiving or sending a signal or any other member of the mobile terminal, which will not be limited in this embodiment. After receiving the service request for receiving or sending a signal, the processor 102 may actuate the at least two pressure sensors, and determine the antenna to receive or send signals based on the pressure values acquired by the at least two pressure sensors, so as to receive or send the signal using the determined antenna in response to the service request. After responding to the service request for receiving or sending a signal, if no signal needs to be received or sent, the at least two pressure sensors may be shut off.

It should be noted that if an antenna to receive or send signals previously determined is different from that currently determined, the processor 102 performs switching of antenna so as to receive or send signals using the currently determined antenna. If the antenna to receive or send signals previously determined is the same as that currently determined, the processor 102 does not need to perform switching of antenna but receives or sends signals directly using the determined antenna.

According to this embodiment, by determining at least one contact position between the user and the mobile terminal, it is judged which antenna is furthest from the at least one contact position. The antenna furthest from the at least one contact position can be considered as not covered by the user (i.e., having the highest signal quality). Therefore, switching of antenna is performed to use the antenna furthest from the at least one contact position. By way of this switching approach, it is possible to switch to the antenna having the highest signal quality in real time, thereby maintaining the signal quality of the mobile terminal in the best state, ensuring adequate signal strength and improving the user experience.

Optional embodiments of this disclosure can be formed by combining the above optional technical solutions in appropriate manners, which will not be described herein one by one.

Figure 2:
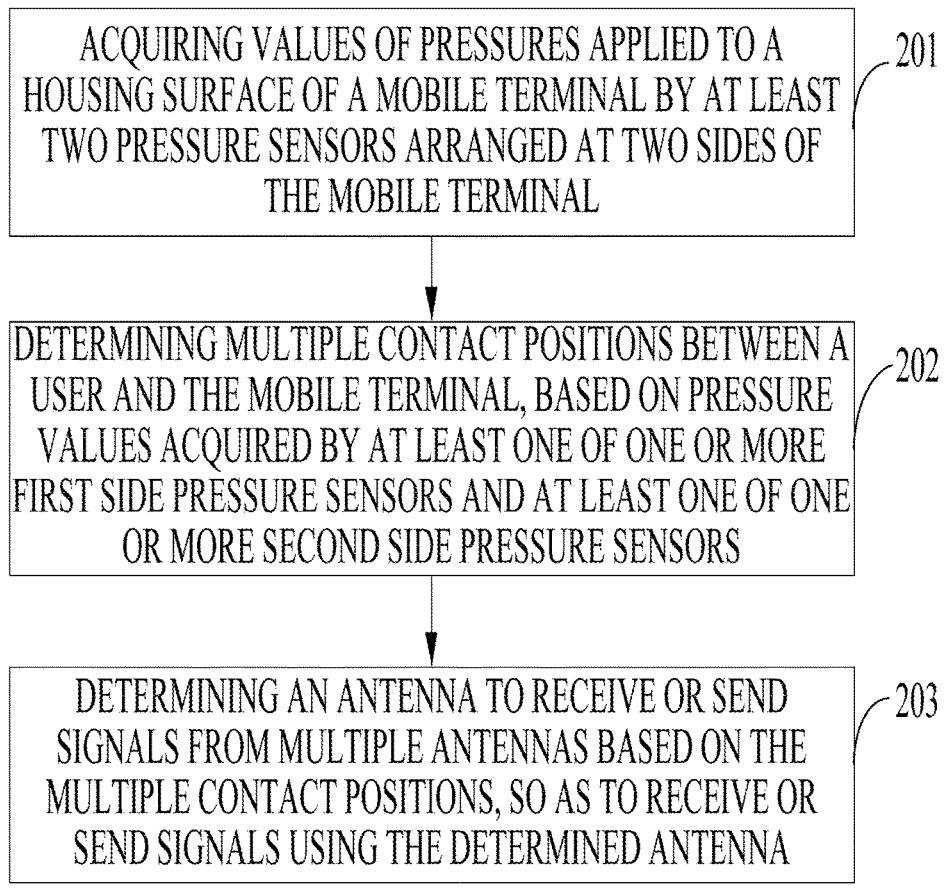
FIG. 2 is a flow chart showing an antenna determining method according to an exemplary embodiment.

FIG. 2 is a flow chart showing an antenna determining method according to an exemplary embodiment. As shown in FIG. 2, the antenna determining method is implemented in a mobile terminal and comprises the following steps.

In step 201, values of pressures applied to a housing surface of the mobile terminal are acquired by at least two pressure sensors arranged at two sides of the mobile terminal, where one or more first side pressure sensors among the at least two pressure sensors are arranged on a surface of a first side frame, and one or more second side pressure sensors among the at least two pressure sensors are arranged on a surface of a second side frame. The second side frame opposes the first side frame. In one example, sensing elements of one or more first side pressure sensors are arranged on a surface of a first side frame, and sensing elements of one or more second side pressure sensors are arranged on a surface of a second side frame.

In step 202, at least one contact position between a user and the mobile terminal are determined based on pressure values acquired by at least one of the first side pressure sensors and at least one of the second side pressure sensors.

In step 203, an antenna to receive or send signals is determined from the at least two antennas based on the at least one contact position, so as to receive or send signals using the determined antenna.

According to the antenna determining method provided by this embodiment, by acquiring values of pressures applied to the mobile terminal using at least two pressure sensors arranged at two sides of the mobile terminal, an antenna to receive or send signals can be determined based on at least one contact position between the user and the mobile terminal when the user holds the mobile terminal with a hand, thereby avoiding interference to signals transmitted or received by an antenna due to the antenna being covered by the user's hand, and thus preventing the mobile terminal's function of receiving and sending signals from being affected.

In another embodiment, determining the at least one contact position between the user and the mobile terminal based on the pressure values acquired by the at least one of the first side pressure sensors and the at least one of the second side pressure sensors comprises: if it is determined that pressure values acquired by at least one of the first side pressure sensors and at least one of the second side pressure sensors at a current time point are different from those acquired at a last time point, determining sensing positions of the at least one of the first side pressure sensors and the at least one of the second side pressure sensors as the contact positions between the user and the mobile terminal.

In yet another embodiment, determining the at least one contact position between the user and the mobile terminal based on the pressure values acquired by the at least one of the first side pressure sensors and the at least one of the second side pressure sensors comprises: if it is determined that pressure values acquired by at least one of the first side pressure sensors and at least one of the second side pressure sensors belong to a preset set of pressure values, determining sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

In yet another embodiment, determining the at least one contact position between the user and the mobile terminal based on the pressure values acquired by the at least one of the first side pressure sensors and the at least one of the second side pressure sensors comprises: if it is determined that pressure values acquired by at least one of the first side pressure sensors and at least one of the second side pressure sensors at a current time point are different from those sent at a last time point and belong to a preset set of pressure values, determining sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

In yet another embodiment, determining the antenna to receive or send signals from the at least two antennas based on the at least one contact position comprises: statistically processing the at least one contact position to obtain a central contact position of the at least one contact position; and determining the furthest antenna from the central contact position among the at least two antennas as the antenna to receive or send signals.

In yet another embodiment, determining the antenna to receive or send signals from the at least two antennas based on the at least one contact position comprises: if a first contact position among the at least one contact position and the rest of the contact position are located on surfaces of different side frames, determining the furthest antenna from the first contact position among the at least two antennas as the antenna to receive or send signals.

In yet another embodiment, the method further comprises: actuating the at least two pressure sensors when receiving a service request for receiving or sending a signal.

FIG. 3 is a flow chart showing an antenna determining method according to another exemplary embodiment. As shown in FIG. 3, the antenna determining method is implemented in a mobile terminal and comprises the following steps.

In step 301, the mobile terminal actuates at least two pressure sensors arranged at its two sides, after receiving a service request for receiving or sending a signal.

The at least two pressure sensors comprises one or more first side pressure sensors and one or more second side pressure sensors. Sensing elements of the first side pressure sensors are arranged on a surface of a first side frame of a housing of the mobile terminal, and sensing elements of the second side pressure sensors are arranged on a surface of a second side frame of the housing of the mobile terminal. The second side frame opposes the first side frame.

In step 302, the mobile terminal acquires values of pressures applied to the housing surface of the mobile terminal using the first side pressure sensors and the second side pressure sensors, and determines at least one contact position between a user and the mobile terminal based on the acquired pressure values.

Step 302 may comprise any one of steps 3021-3023.

In step 3021, if it is determined that pressure values acquired by at least one of the first side pressure sensors and at least one of the second side pressure sensors at a current time point are different from those acquired at a last time point, sensing positions of the at least one of the first side pressure sensors and the at least one of the second side pressure sensors are determined as the contact positions between the user and the mobile terminal.

In step 3022, if it is determined that pressure values acquired by at least one of the first side pressure sensors and at least one of the second side pressure sensors belong to a preset set of pressure values, sensing positions of the at least one of the first side pressure sensors and the at least one of the second side pressure sensors are determined as the contact positions between the user and the mobile terminal, wherein the preset set of pressure values is set according to pressure values generated when a human presses the housing surface of the mobile terminal.

In step 3023, if it is determined that pressure values sent by at least one of the first side pressure sensors and at least one of the second side pressure sensors at a current time point are different from those sent at a last time point and belong to a preset set of pressure values, sensing positions of the at least one of the first side pressure sensors and the at least one of the second side pressure sensors are determined as the contact positions between the user and the mobile terminal, wherein the preset set of pressure values is set according to pressure values generated when a human presses the housing surface of the mobile terminal.

By using any one of the above steps 3021-3023, at least one contact position between the user and the mobile terminal can be determined according to changes of the pressure values. Of course, the mobile terminal may determine the at least one contact position using methods other than above steps 3021-3023, which will not be limited in this embodiment.

In step 303, if a first contact position among the at least one contact position and the rest of the contact positions are located on surfaces of different side frames, the furthest antenna from the first contact position among the at least two antennas is determined as the antenna to receive or send signals, so as to receive or send signals using the determined antenna.

This embodiment only takes step 303 as an example to describe how the antenna is determined based on the at least one contact position. In fact, the antenna can be determined based on the at least one contact position according to other methods.

For example, step 303 may be replaced by the following steps of: statistically processing the at least one contact position to obtain a central contact position of the at least one contact position; and determining the furthest antenna from the central contact position among the at least two antennas as the antenna to receive or send signals.

When statistically processing the at least one contact position, the mobile terminal may establish a coordinate system, calculate average coordinates based on coordinates of the at least one contact position in the coordinate system and take the position corresponding to the calculated average coordinates as the central contact position, or select one of the at least one contact position which is located at the center as the central contact position based on the coordinates of the at least one contact position in the coordinate system.

It should be noted that the above steps 301-303 may be performed by control logic programs of the mobile terminal. In operation, the control logic programs may be run by a processor of the mobile terminal. Under the control of the control logic programs, pressure values sent by the pressure sensors are received, at least one contact position between the user and the mobile terminal are determined based on the received pressure values, and then switching of antenna can be controlled based on the at least one contact position.

According to the antenna determining method provided by this embodiment, by acquiring values of pressures applied to the mobile terminal using at least two pressure sensors arranged at two sides of the mobile terminal, an antenna to receive or send signals can be determined based on at least one contact position between the user and the mobile terminal when the user holds the mobile terminal with a hand, thereby avoiding interference to signals transmitted or received by an antenna due to the antenna being covered by the user's hand, and thus preventing the mobile terminal's function of receiving and sending signals from being affected.

With respect to the method in the above embodiment, the specific manners for executing the individual steps have been described in detail in the embodiments of the mobile terminal shown in FIG. 1A and will not be elaborated herein.

Figure 4:
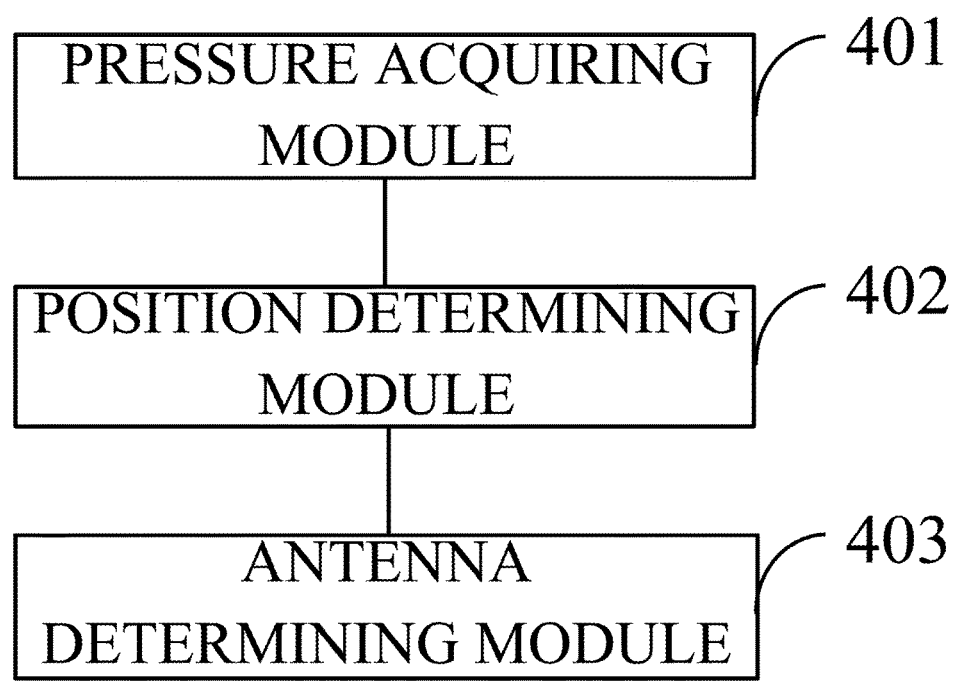
FIG. 4 is block diagram illustrating a mobile terminal according to an exemplary embodiment.

FIG. 4 is block diagram illustrating a mobile terminal according to an exemplary embodiment. As shown in FIG. 4, the mobile terminal comprises a pressure acquiring module 401, a position determining module 402 and an antenna determining module 403.

The pressure acquiring module 401 is configured to acquire values of pressures applied to a housing surface of the mobile terminal by at least two pressure sensors arranged at two sides of the mobile terminal, where one or more first side pressure sensors among the at least two pressure sensors are arranged on a surface of a first side frame of the mobile terminal, and one or more second side pressure sensors among the at least two pressure sensors are arranged on a surface of a second side frame of the mobile terminal, the second side frame opposing the first side frame.

The position determining module 402 is configured to determine at least one contact position between a user and the mobile terminal, based on pressure values acquired by at least one of the first side pressure sensors and at least one of the second side pressure sensors.

The antenna determining module 403 is configured to determine an antenna to receive or send signals from the at least two antennas based on the at least one contact position so as to receive or send signals using the determined antenna. The antenna determining module 403 may select the antenna as the preferred antenna to receive or send signals. Additionally or alternatively, the mobile terminal may adjust transmission power levels to the preferred antenna so that the preferred antenna has a higher transmission power compared to the other antennas.

According to the mobile terminal provided by this embodiment, by acquiring values of pressures applied to the mobile terminal using at least two pressure sensors arranged at two sides of the mobile terminal, an antenna to receive or send signals can be determined based on at least one contact position between the user and the mobile terminal when the user holds the mobile terminal with a hand, thereby avoiding interference to signals transmitted or received by an antenna due to the antenna being covered by the user's hand, and thus preventing the mobile terminal's function of receiving and sending signals from being affected.

In another embodiment, the position determining module 402 is configured to, when it is determined that pressure values acquired by at least one of the first side pressure sensors and at least one of the second side pressure sensors at a current time point are different from those acquired at a last time point, determine sensing positions of the at least one of the first side pressure sensors and the at least one of the second side pressure sensors as the contact positions between the user and the mobile terminal.

In yet another embodiment, the position determining module 402 is configured to, when it is determined that pressure values acquired by at least one of the first side pressure sensors and at least one of the second side pressure sensors belong to a preset set of pressure values, determine sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

In yet another embodiment, the position determining module 402 is configured to, when it is determined that pressure values acquired by at least one of the first side pressure sensors and at least one of the second side pressure sensors at a current time point are different from those sent at a last time point and belong to a preset set of pressure values, determine sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

In yet another embodiment, the antenna determining module 403 is configured to statistically process the at least one contact position to obtain a central contact position of the at least one contact position, and to determine the furthest antenna from the central contact position among the at least two antennas as the antenna to receive or send signals.

In yet another embodiment, the antenna determining module 403 is configured to, if a first contact position among the at least one contact position and the rest of the contact positions are located on surfaces of different side frames, determine the furthest antenna from the first contact position among the at least two antennas as the antenna to receive or send signals.

In yet another embodiment, the mobile terminal further comprises: an actuating module configured to actuate the at least two pressure sensors when a service request for receiving or sending a signal is received.

With respect to the mobile terminal in the above embodiment, the specific manners for the individual modules to perform operations have been described in detail in the embodiments of the mobile terminal shown in FIG. 1A and will not be elaborated herein. Here, the mobile terminal may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The mobile terminal may use the circuitries in combination with the other hardware or software components for performing the above described methods. Each module, sub-module, unit, or sub-unit in the disclosure may be implemented at least partially using the one or more circuitries.

It should be noted that: when an antenna is determined by using the mobile terminal provided by the above embodiments, the above division into respective functional modules is only given by way of example. In practical application, the above functions may be implemented by different functional modules as required; that is, the internal structure of the mobile terminal may be divided into different functional modules to realize all or part of the above functions. In addition, since the mobile terminal and the antenna determining method provided by the above embodiments belong to the same concept, reference can be made to the method embodiments for the implementation of the mobile terminal, and the description thereof will be omitted here for simplicity.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A mobile terminal comprising:
 a housing comprising a first side frame and a second side frame;
 a processor disposed at least partially in the housing; and
 at least two antennas and at least two pressure sensors arranged at two sides of the mobile terminal, wherein the at least two antennas and the at least two pressure sensors are connected with the processor respectively;
 wherein one or more first side pressure sensors among the at least two pressure sensors are arranged on a surface of a first side frame of the housing, and one or more second side pressure sensors among the at least two pressure sensors are arranged on a surface of a second side frame of the housing, the second side frame opposing the first side frame;
 wherein the at least two pressure sensors are configured to acquire values of pressures applied to a surface of the housing and send the acquired pressure values to the processor;
 wherein the processor is configured to receive pressure values sent by the pressure sensors and to determine at least one contact position between a user and the mobile terminal based on pressure values; and
 wherein one of the at least two antennas is selected as a preferred antenna and the preferred antenna has a higher transmission power than the other antennas;
 wherein the processor is configured to establish a coordinate system, and statistically process the at least one contact position to obtain a central contact position of the at least one contact position in the coordinate system, and to determine the furthest antenna from the central contact position among the at least two antennas as the antenna to receive or send signals.

2. The mobile terminal according to claim 1, where the processor is further configured to determine the at least one contact position based on pressure values sent by at least one of the first side pressure sensors and at least one of the second side pressure sensors, and to determine an antenna to receive or send signals from the at least two antennas based on the at least one contact position.

3. The mobile terminal according to claim 1, where the processor is further configured to receive or send signals using the preferred antenna.

4. The mobile terminal according to claim 1, wherein the processor is configured to, when it is determined that pressure values sent by at least one of the first side pressure sensors and at least one of the second side pressure sensors at a current time point are different from those sent at a last time point, determine sensing positions of the at least one of the first side pressure sensors and the at least one of the second side pressure sensors as the contact positions between the user and the mobile terminal.

5. The mobile terminal according to claim 1, wherein the processor is configured to, when it is determined that pressure values sent by at least one of the first side pressure sensors and at least one of the second side pressure sensors belong to a preset set of pressure values, determine sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

6. The mobile terminal according to claim 1, wherein the processor is configured to, when it is determined that pressure values sent by at least one of the first side pressure sensors and at least one of the second side pressure sensors at a current time point are different from those sent at a last time point and belong to a preset set of pressure values, determine sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

7. The mobile terminal according to claim 1, wherein the processor is further configured to actuate the at least two pressure sensors when receiving a service request for receiving or sending a signal.

8. A method, comprising:
acquiring, by a mobile terminal comprising a housing including a first side frame and a second side frame opposing each other, values of pressures applied to the housing by at least two pressure sensors arranged at two sides of the mobile terminal, wherein one or more first side pressure sensors among the at least two pressure sensors are arranged on the first side frame of the mobile terminal, and one or more second side pressure sensors among the at least two pressure sensors are arranged on the second side frame of the mobile terminal;
determining at least one contact position between a user and the mobile terminal, based on pressure values acquired by at least one of the first side pressure sensors and at least one of the second side pressure sensors; and
selecting an antenna as a preferred antenna from the at least two antennas based on the at least one contact position wherein the preferred antenna has a higher transmission power than the other antennas,
wherein determining the antenna to receive or send signals from the at least two antennas based on the at least one contact position comprises:
establishing a coordinate system, and statistically processing the at least one contact position to obtain a central contact position of the at least one contact position in the coordinate system; and
determining the furthest antenna from the central contact position among the at least two antennas as the antenna to receive or send signals.

9. The method according to claim 8, further comprising: using the preferred antenna to receive or send signals.

10. The method according to claim 8, wherein determining the at least one contact position between the user and the mobile terminal based on the pressure values acquired by the at least one of the first side pressure sensors and the at least one of the second side pressure sensors comprises:
if it is determined that pressure values acquired by at least one of the first side pressure sensors and at least one of the second side pressure sensors at a current time point are different from those acquired at a last time point, determining sensing positions of the at least one of the first side pressure sensors and the at least one of the second side pressure sensors as the contact positions between the user and the mobile terminal.

11. The method according to claim 8, wherein determining the at least one contact position between the user and the mobile terminal based on the pressure values acquired by the at least one of the first side pressure sensors and the at least one of the second side pressure sensors comprises:
when it is determined that pressure values acquired by at least one of the first side pressure sensors and at least one of the second side pressure sensors belong to a preset set of pressure values, determining sensing positions of the at least one of the first side pressure sensors and the at least one of the second side pressure sensors as the contact positions between the user and the mobile terminal, wherein the preset set of pressure values is set according to pressure values generated when a human presses the housing surface of the mobile terminal.

12. The method according to claim 8, wherein determining the at least one contact position between the user and the mobile terminal based on the pressure values acquired by the at least one of the first side pressure sensors and the at least one of the second side pressure sensors comprises:
when it is determined that pressure values acquired by at least one of the first side pressure sensors and at least one of the second side pressure sensors at a current time point are different from those acquired at a last time point and belong to a preset set of pressure values, determining sensing positions of the at least one of the first side pressure sensors and the at least one of the second side pressure sensors as contact positions between the user and the mobile terminal, wherein the preset set of pressure values is set according to pressure values generated when a human presses the housing surface of the mobile terminal.

13. The method according to claim 8, further comprising: actuating the at least two pressure sensors when receiving a service request for receiving or sending a signal.

* * * * *